Oct. 13, 1925.　　　　　　　　　　　　　　　　　　1,556,746
J. R. BARTHOLOMEW
BRAKE DRUM CONSTRUCTION
Original Filed Nov. 28, 1922
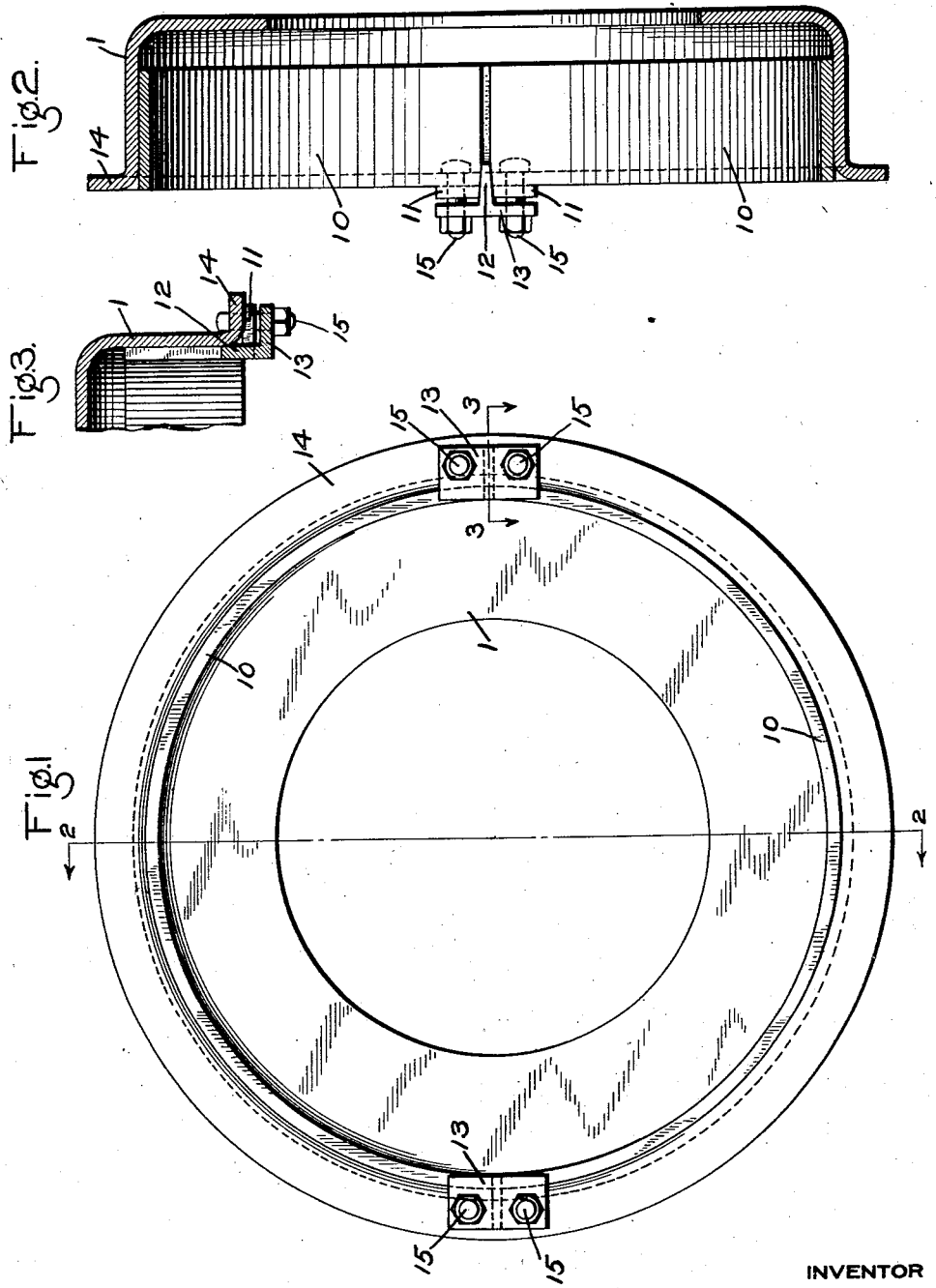
INVENTOR
JOHN R. BARTHOLOMEW
BY Wm. M. Cady
ATTORNEY Patented Oct. 13, 1925.

1,556,746

UNITED STATES PATENT OFFICE.

JOHN R. BARTHOLOMEW, OF MONTCLAIR, NEW JERSEY, ASSIGNOR TO THE WESTINGHOUSE AIR BRAKE COMPANY, OF WILMERDING, PENNSYLVANIA, A CORPORATION OF PENNSYLVANIA.

BRAKE-DRUM CONSTRUCTION.

Original application filed November 28, 1922, Serial No. 603,775. Divided and this application filed January 4, 1924. Serial No. 684,333.

*To all whom it may concern:*

Be it known that I, JOHN R. BARTHOLOMEW, a citizen of the United States, residing at Montclair, in the county of Essex and State of New Jersey, have invented new and useful Improvements in Brake-Drum Constructions, of which the following is a specification.

This invention relates to brake mechanisms of the drum type, and more particularly as employed on motor vehicles.

The principal object of my invention is to provide renewable members adapted to be applied to a brake drum and which may be readily removed and applied when the members become worn by reason of the frictional engagement of the brake shoes therewith.

The present application is a division of application Serial No. 603,775, filed November 28, 1922.

In the accompanying drawing; Fig. 1 is a face view of a brake drum, showing the improved wear members applied thereto; Fig. 2 a section on the line 2—2 of Fig. 1; and Fig. 3 a section on the line 3—3 of Fig. 1.

As shown in the drawing, a brake drum 1 is provided, which is adapted to be secured to the wheel of a motor vehicle in the usual manner. According to my invention, in order to provide a renewable braking surface for the internal face of the brake drum 1, I employ a pair of semi-cylindrical metal bands 10 adapted to engage the internal annular face of the brake drum. A lug 11 is provided at each end of each band 10 and at one side only. When the liners 10 are positioned in the drum, there is a space provided between the adjacent ends of the two liners for receiving a wedge member.

Said wedge member may comprise a wedge portion 12 carried by a plate 13 and the wedge portion 12 of the wedge member is inserted in the space between the adjacent ends of the liners. Bolts 15 are then passed through alined openings in the flange 14 of the drum 1, the lugs 11 and the plate 13. When the bolts 15 are drawn up, the wedge portion 12 acts to spread the liners 10, so as to effect a tight frictional engagement of the liners with the internal face of the brake drum, thus securely holding the liners in place.

Since the bolts 15 are easily accessible from the side of the drum, the liners 10 may be readily removed when worn and then replaced by new liners, without the necessity of disturbing or removing any parts of the brake mechanism.

Having now described my invention, what I claim as new and desire to secure by Letters Patent, is:—

1. The combination with a brake drum, of renewable liners mounted within said drum and comprising segments presenting an internal cylindrical braking surface within the drum and means for securing said segments to the brake drum, the segments being removable by a movement parallel to the axis of the drum.

2. The combination with a brake drum having an internal annular surface concentric with the axis of the drum and having a flange in a plane at right angles to the axis of the drum, of renewable wearing segments engaging said annular surface and provided with lugs facing said flange and bolts extending through openings in said flange and said lugs for securing the segments to the drum.

3. The combination with a brake drum, of cylindrical wear segments mounted in said drum and a wedging member interposed between adjacent ends of the segments for expanding the segments into engagement with the drum.

In testimony whereof I have hereunto set my hand.

JOHN R. BARTHOLOMEW.